March 14, 1961  D. W. BINGHAM  2,974,691
SYRUPING APPARATUS FOR USE IN THE CANNING
OF FRUIT AND VEGETABLES
Filed April 28, 1959  5 Sheets-Sheet 1

INVENTOR
DAVID W. BINGHAM

INVENTOR
DAVID W. BINGHAM

March 14, 1961 D. W. BINGHAM 2,974,691
SYRUPING APPARATUS FOR USE IN THE CANNING
OF FRUIT AND VEGETABLES
Filed April 28, 1959 5 Sheets-Sheet 3

INVENTOR

DAVID W. BINGHAM

BY *Imirie & Smiley*
Attys.

INVENTOR
DAVID W. BINGHAM
BY Imrie & Smiley
Att'ys.

March 14, 1961
D. W. BINGHAM
2,974,691
SYRUPING APPARATUS FOR USE IN THE CANNING OF FRUIT AND VEGETABLES
Filed April 28, 1959
5 Sheets-Sheet 5
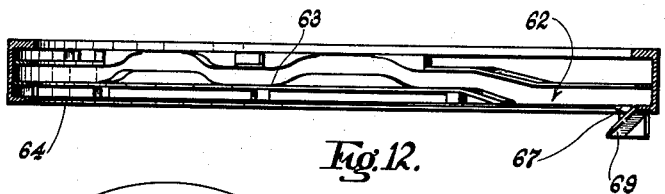
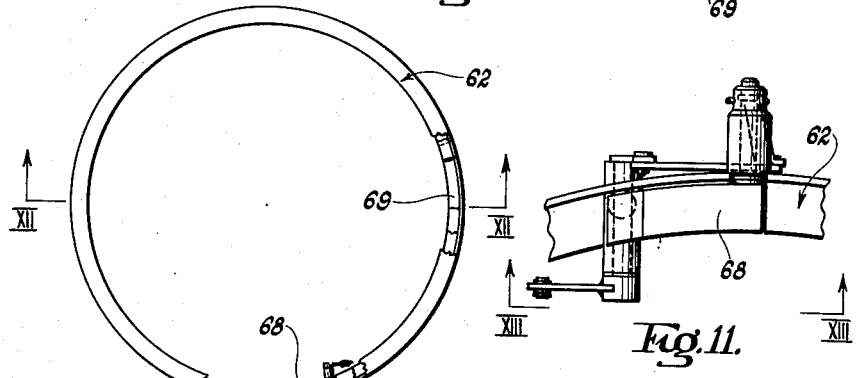
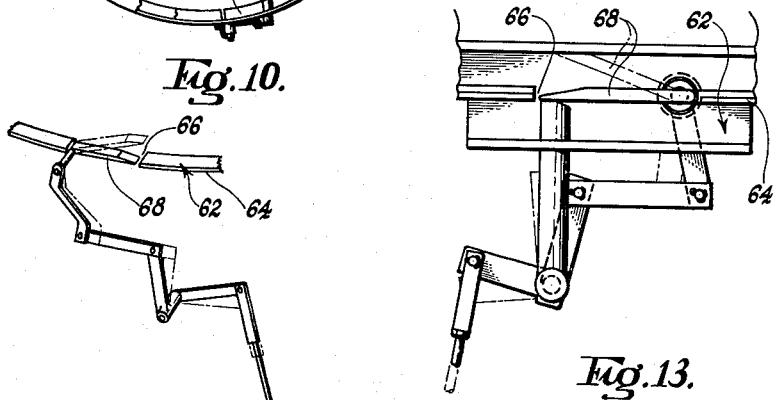
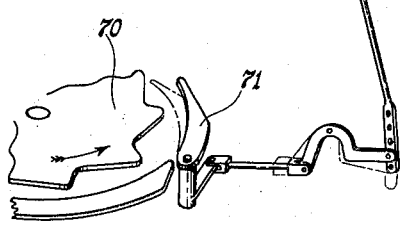
INVENTOR
DAVID W. BINGHAM

United States Patent Office 2,974,691
Patented Mar. 14, 1961

2,974,691
SYRUPING APPARATUS FOR USE IN THE CANNING OF FRUIT AND VEGETABLES
David William Bingham, 32 Edro Ave., Brighton, Victoria, Australia
Filed Apr. 28, 1959, Ser. No. 809,399
9 Claims. (Cl. 141—142)

This invention relates to apparatus for use in connection with the canning of fruit and vegetables and more particularly concerns syruping apparatus of the kind disclosed in my prior Australian patent specification No. 147,723. Such apparatus is adapted to introduce syrup into cans after fruit or vegetables have been packed therein prior to closing the can and cooking the contents, means being provided for creating a partial vacuum in the can for removing most of the air trapped for example, beneath sections of halved fruit in the cans.

The primary object of the invention is to simplify the filler heads employed in apparatus of the type mentioned whereby the cost of production and maintenance is materially reduced whilst retaining a high standard of efficiency.

Furthermore, the improved filler head requires less effort for its operation by comparison with the filler heads of the earlier apparatus mentioned. The new construction avoids the use of a heavy weight return spring as previously employed for breaking the seal after the can has been filled and permitting a fresh charge of syrup to enter the filler head.

Various other novel features and advantages arising from the use of the invention will be more readily apparent from the following detailed description.

Referring to the drawings which form part of this specification:

Figure 10 is a plan view on a reduced scale, showing a cam track associated with the mechanism seen in Figures 7 to 9.

Figure 11 is an enlarged detail showing a displaceable portion of the track seen in Figure 10.

Figure 12 is a fragmentary enlarged side view of part of the track seen in Figure 10.

Figure 13 is an enlarged side view of the parts seen in Figure 11.

Figure 14 is a semi-diagrammatic side elevation showing mechanism for actuating the displaceable track sections seen in Figures 11 and 13.

Figure 1:
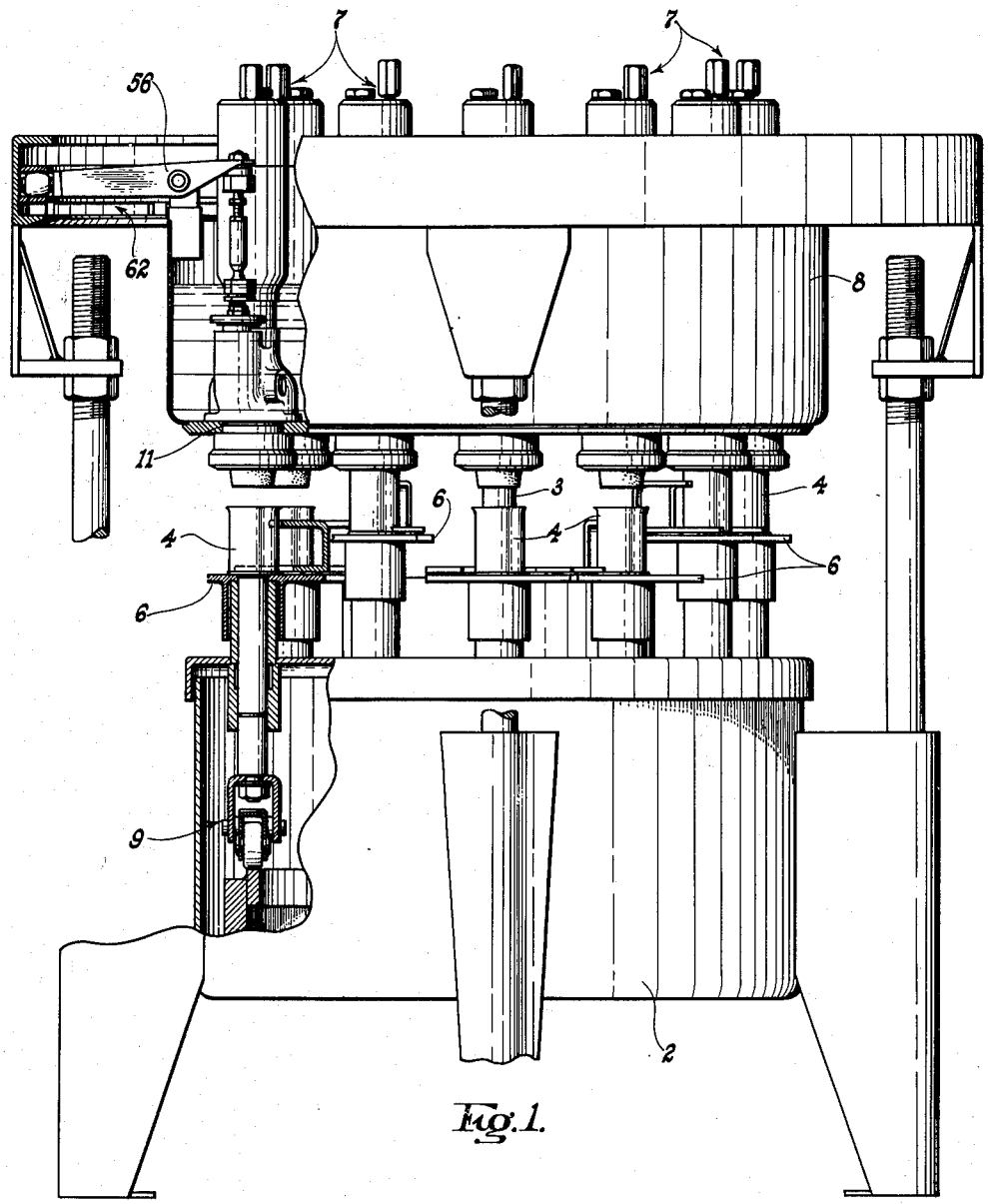
Figure 1 is a part sectional side elevation of apparatus in accordance with the present invention, parts being broken away and omitted for convenience of illustration.

In common with my previous syruping apparatus, the improved construction also includes a supporting unit 2 carrying an upstanding central standard 3 having mounting means thereon for a series of cans 4 and can filling mechanism, any suitable means being provided for effecting rotation of such mounting means.

The rotary mounting means includes a series of circumferentially spaced can platforms 6 and means for raising and lowering such platforms in synchronism with the operation of a series of associated filler heads 7. The latter form part of the can filling mechanism which includes a main supply bowl 8 for the syrup or other liquid to be supplied to the cans, the bowl being carried by the aforesaid standard and when in use is kept filled to an appropriate level from any suitable bulk supply, for example, by means of a float controlled valve.

As seen in Figure 1, the various filling heads are mounted within and upon the bottom of the supply bowl and arranged in circumferentially spaced relationship in registry with the can platforms. Any suitable known elevating mechanism 9 is employed for effecting relative vertical movement between the main supply bowl and the can platforms so as to accommodate different sized cans.

Each of the filling heads 7 is in the form of a unit which is adapted for removable mounting within a hole 11 in the bottom of the supply bowl.

In accordance with the present invention, each filler head includes a hollow body 12 communicating with an upstanding cylinder 13 and a lateral branch 14 which is open-topped and located below the normal liquid level within the bowl. The hollow body preferably has a circular base 16 fitted with means for detachably connecting the filler head to the bottom of the bowl.

Figure 2:
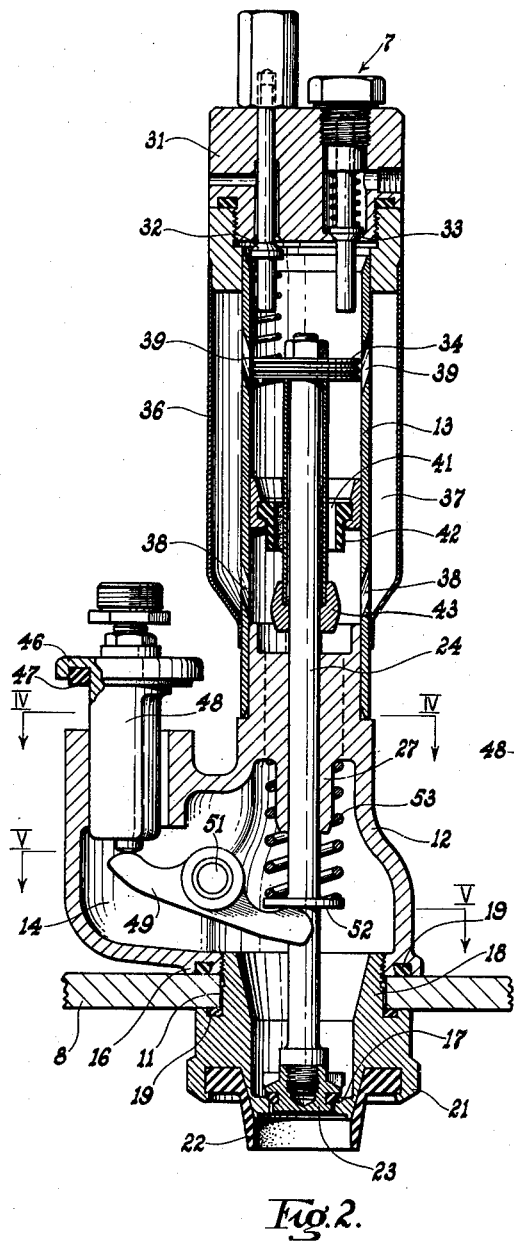
Figure 2 is a vertical section on an enlarged scale of a filler head which forms part of the apparatus seen in Figure 1 and showing a main discharge valve in its closed position.
Figure 3:
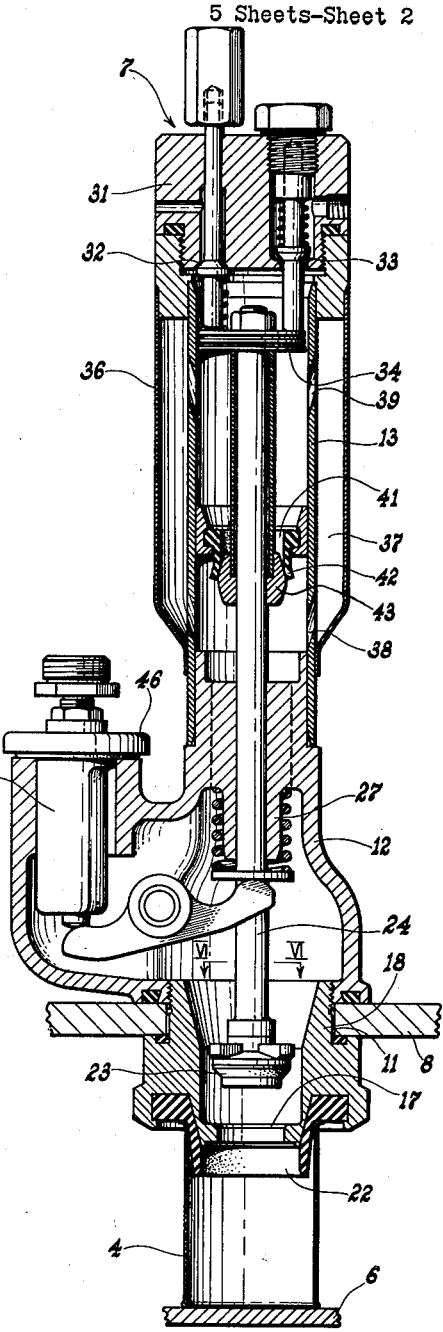
Figure 3 is a view similar to Figure 1 but showing the discharge valve in its open position for delivering syrup to a can.

The hollow body is also provided with a discharge valve seating 17 which is preferably formed separately and provided with an upstanding neck 18 adapted to pass freely through the hole 11 in the bowl bottom so that it may be screwed into the circular base of the filler head as shown in Figures 2 and 3. Any suitable type of sealing rings 19 may be fitted to the circular base and the valve seating for engaging the opposite sides of the bowl bottom.

The discharge valve seating also includes a depending rim 21 carrying a circular resilient spacer element 22 adapted to fit within the top of a can so as to ensure that sufficient space is left therein after the syruping operation has been completed prior to the fitting of a closing lid.

The hollow body of each filler head is also provided with a main discharge valve 23 having a stem 24 extending axially within the upstanding cylinder 13, the discharge valve being spring influenced so as to normally urge it into engagement with its seating.

Figure 4:
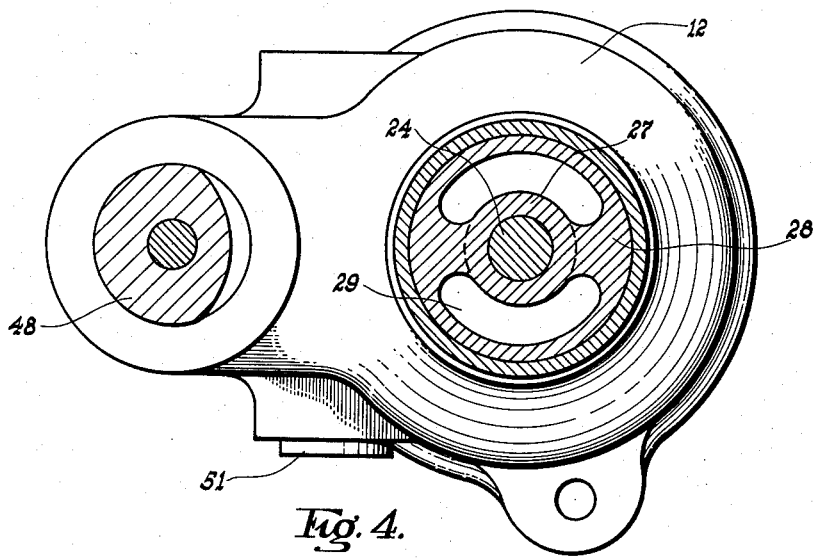
Figure 4 is an enlarged cross section taken on the line IV—IV of Figure 2.
Figure 5:
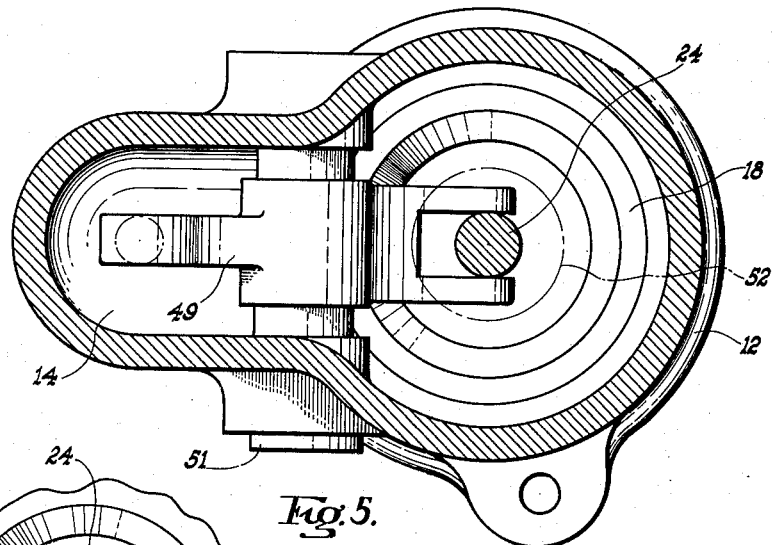
Figure 5 is an enlarged cross section taken on the line V—V of Figure 2.
Figure 6:
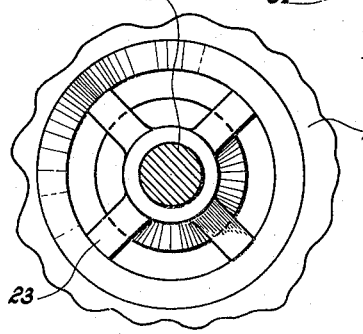
Figure 6 is an enlarged sectional plan of the main discharge valve taken on the line VI—VI of Figure 3.

As seen more clearly in Figure 4, the stem of the discharge valve may slide freely through a guide sleeve 27 carried by a web 28 extending across the cylinder and which is provided with a series of passages 29 so as to establish communication between the main portion of the cylinder above the web and the hollow body.

The upper end portion of the cylinder 13 extends above the normal liquid level in the main bowl and is preferably fitted with a removable top closure 31. The latter is also provided with ports and passages communicating with the atmosphere and also with a vacuum pump or the like, spring influenced air and vacuum valves 32 and 33 respectively being provided for opening and closing these passages in accordance with the opening and closing movement of the main discharge valve 23. The stem of the last mentioned valve is provided at its upper end with a piston or striking plate 34 adapted to engage stems on the associated air and vacuum valves, the arrangement being such that when the air valve is closed the vacuum valve is opened and vice versa.

The piston or striking plate is necessarily a loose fit in the cylinder 13 as it is essential for air to be able to pass freely around the edges of the piston whilst the filter head is subjected to the influence of the vacuum pump.

For obvious reasons it is desirable to separate as much as possible of the syrup from the air leaving the cylinder to the vacuum pump and for this purpose the cylinder 13 is preferably surrounded by a laterally spaced outer casing 36 forming an annular separating chamber 37 around the cylinder wall. One or more inlet ports 38 extend through the cylinder wall near the bottom of the separating chamber and each of these ports is preferably inclined transversely so as to impart a swirling motion to the air and syrup entering the separating chamber with the result that the syrup is flung against the wall of the outer casing and drains downwardly thereover whilst the separated air is drawn upwardly through the separating chamber.

One or more outlet ports 39 are also formed in the cylinder wall near the upper end of the separating chamber so as to permit the air being withdrawn to re-enter the cylinder and pass through the vacuum valve 33. Each of the outlet ports is preferably inclined downwardly and transversely so as to impart a swirling motion to the air re-entering the cylinder. Thus, any syrup remaining in the air stream is flung onto the cylinder wall and flows down into a transfer port 41 which may be cup shaped as seen in Figures 2 and 3. It will be appreciated that the aforesaid piston or striking plate 34 also functions as a baffle to assist in separating the last of the syrup from the outflowing air stream.

The transfer port 41 is located at an intermediate point in the height of the cylinder and is adapted to be opened and closed during the reciprocatory movements of the main discharge valve stem 24. For this purpose the transfer port may include a depending neck 42 surrounding the stem and composed of rubber, plastic or like resilient material. The stem may be provided with a tapered plug 43 adapted to form a fluid tight fit in the bottom of the depending neck when the main discharge valve 23 is open.

The aforesaid lateral branch 14 of the hollow body is also fitted with an inlet valve 46 for the syrup and this valve is operatively connected with the main discharge valve 23 so that their movements may be synchronised. In addition, means are provided for raising and lowering the syrup inlet valve in accordance with requirements. This inlet valve may be of circular form and provided with rubber or any other resilient seal 47 adapted to engage the open top of the lateral branch. The valve may also be provided with a series of ribs or the like 48 to guide the valve during its opening and closing movements.

The aforesaid operative connections may consist of a rocking lever 49 pivotally mounted at an intermediate point in its length as at 51 upon a bracket on the bottom of the hollow body and adapted at one end to be engaged by the syrup inlet valve 46 whilst its opposite end may be forked so as to embrace the stem of the main discharge valve 23 beneath a shoulder 52 thereon. A return spring 53 may extend between the opposite side of this shoulder and the transverse web 28 in the cylinder.

Figure 7:
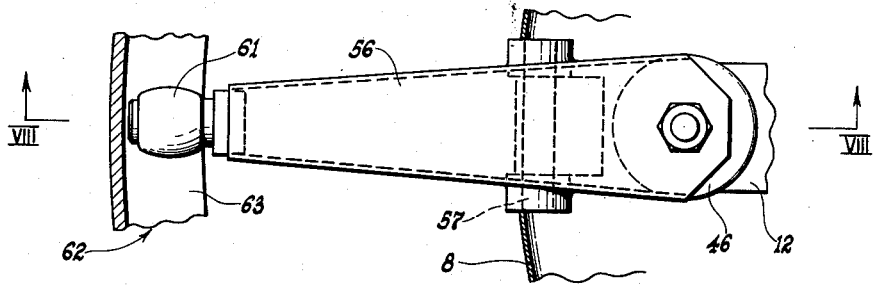
Figure 7 is an enlarged plan view of means for actuating the syrup inlet valve seen in Figures 2 and 3.
Figure 8:
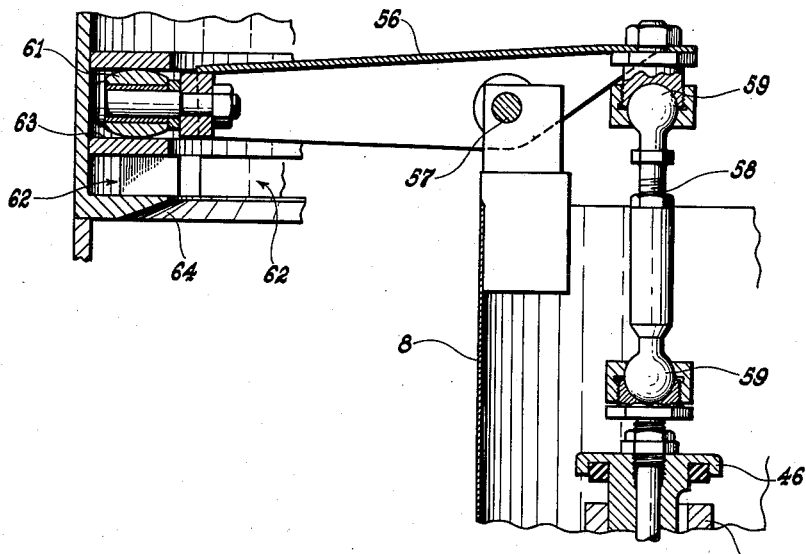
Figure 8 is a sectional elevation taken on the line VIII—VIII of Figure 7.

The means employed for actuating each syrup inlet valve may include lever mechanism adapted to be actuated automatcally during rotation of the main supply bowl 8 in relation to a stationary part of the machine. Such lever mechanism includes a separate lever 56 for each filler head which may be intermediately pivoted as at 57 upon the wall of the main supply bowl seen more clearly in Figures 7, 8 and 9.

The inner end of this lever is operatively connected with its syrup inlet valve. These connections are preferably adjustable in length and for that purpose may include a screw coupling 58 and in order to provide desirable freedom of movement between the syrup inlet valve and its lever and their connections, the latter also preferably includes ball and socket fittings 59 at the opposite ends thereof.

Each lever 56 is fitted at its outer end with an anti-friction roller 61 adapted to traverse a circular trackway 62 on the machine frame during rotation of the main supply bowl. This circular trackway may be formed in any suitable manner. For example, as shown in the drawings it may be fabricated from a plurality of vertically spaced rings or flanges so as to provide upper and lower tracks 63 and 64 respectively, the upper track being of sinuous form so as to cause the lever 56 of each filler head to rise and fall and thus open and close its syrup inlet valve whilst cans continue to be fed to the machine.

The lower track 64 forms part of no can, no feed mechanism for preventing closure of the syrup inlet valve 46 and consequential opening of the main discharge valve 23 when feeding of the cans to the machine is interrupted. Said no can, no feed mechanism includes two circumferentially spaced transfer gaps 66 and 67 in the trackway whereby the rollers 61 on the lever arms 56 may be caused to traverse either the upper or lower track in accordance with requirements.

Figure 9:
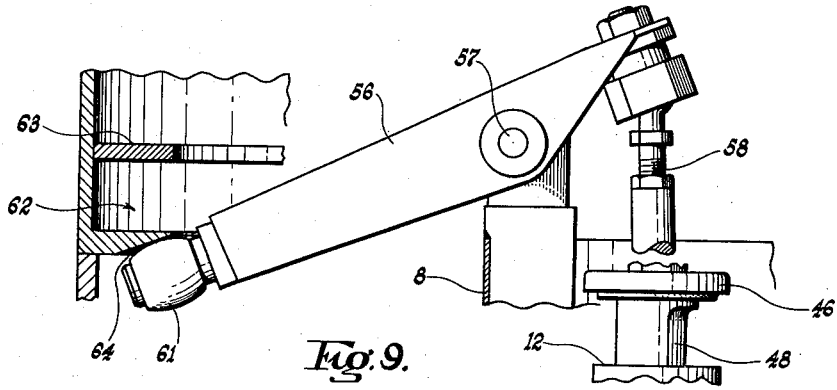
Figure 9 is a view similar to Figure 8 but showing the mechanism in its no can, no feed position.

One of these gaps 66 is fitted with a swinging gate 68 which is adapted to be raised when the feeding of cans is interrupted and thus deflect the next oncoming roller to the lower track 64 so as to hold the syrup inlet valve 46 open as seen more clearly in Figure 9.

The other gap 67 in the trackway is fitted with a fixed ramp 69 for returning the roller to the upper track 63 after it has nearly completed a single traverse of the lower track. The two gaps 66 and 67 in the trackway are spaced apart a predetermined distance so that closing movement of a syrup inlet valve 46 will not occur whilst its roller is moving on the upper track between the two gaps as it would be necessary for the roller to be returned to the lower track if its can is missing.

It will be understood that if there is no interruption to the can feed, the swinging gate 68 will remain closed and thus form part of the upper track, the fixed ramp 69 below the other gap functioning to prevent the rollers 61 from transferring to the lower track as they pass over the last mentioned gap.

Means are provided for actuating the swinging gate in accordance with requirements. Such means may consist of a system of pivoted links and levers as seen in Figure 14 which are preferably associated with a can conveyor 70 provided for feeding cans to the machine. For example, this system may include a spring influenced swinging arm 71 adapted to be engaged by each can as it is carried forward by the conveyor. If a can is missing from the conveyor this arm swings across the path of the oncoming cans and automatically raises the swinging gate 68 to deflect the next oncoming roller to the lower track 64 and thus interrupt the feed of syrup through the filler head which is not supplied with a can.

Alternatively the swinging gate 68 may be operatively connected in any suitable manner with the elevating mechanism 9 provided for raising and lowering the can platforms as aforesaid.

Instead of employing mechanical means for actuating the swinging gate 68 such movement may be effected electrically if so desired. For example, a solenoid may be associated with the swinging gate and be wired in circuit with a switch actuated by the cans as they are carried forward on the conveyor.

In use, whilst each syrup inlet valve 45 is raised as aforesaid so as to admit the syrup to its filler head, the associated main discharge valve 23 is closed under the influence of its spring. Consequently, the associated vacuum valve 33 is closed and the air valve 32 is opened so as to not to interfere with the free entry of liquid from the bowl 8 into each filler head cylinder.

When the syrup inlet valve 46 closes the main discharge valve 23 is automatically opened and this has the effect of closing the air valve 32 and opening the vacuum valve 33 thus subjecting the can being filled to the influence of the vacuum and facilitating the admission of the syrup to the can. When the predetermined quantity of syrup has entered the can the discharge valve 23 closes automatically and the syrup inlet valve 46 is opened to again repeat the filling operation during the continued rotation of the main bowl and the filling heads carried thereby.

Although the invention has been primarily designed for the supply of syrup to canned fruit, it is to be understood that the use of the invention is not limited thereto but that it may be employed for example, for adding brine or any other suitable liquid to canned vegetables. Furthermore it is desired that the term "can" is to be construed so as to include containers made of glass or any other suitable material.

It is to be understood that various alterations, modifications and/or additions may be introduced into the foregoing construction and arrangement of parts without departing from the ambit of the invention as defined by the appended claims.

Having now described my invention, what I claim as new and desire to secure by Letters Patent is:

1. Apparatus of the kind indicated characterised by a filler head mounted upon a main syrup supply bowl so as to be partly immersed in the syrup, said filler head having a hollow body carrying an upstanding cylinder and an inlet port fitted with a syrup inlet valve, a spring influenced discharge valve located beneath said cylinder and adapted to be brought into registry with the open top of a can to be filled and spring influenced air and vacuum valves mounted upon said cylinder, said syrup inlet valve being operatively connected with said discharge valve so that when the former is open the latter is closed and vice versa for the purpose specified, said cylinder being surrounded by an outer casing forming an annular separating chamber around said cylinder which is provided with an inlet port near the bottom of the separating chamber which port is inclined transversely so as to impart a swirling motion to air and syrup entering said chamber when the latter is subjected to the influence of a vacuum, an outlet port being formed through the cylinder wall near the upper end of the separating chamber so as to permit air passing through the chamber to re-enter the cylinder and escape through said vacuum valve, said outlet port being inclined downwardly and transversely so as to impart a swirling motion to the air re-entering the cylinder which is provided at an intermediate point in its length with a transfer port adapted to be opened and closed during reciprocatory movements in the main discharge valve for the purpose specified.

2. Apparatus of the kind indicated comprising a main syrup supply bowl mounted upon a stationary supporting frame and adapted for rotary movement in relation to said frame, a series of circumferentially spaced filler heads mounted within said bowl so as to be partly immersed in the contents thereof, said bowl having a series of holes in its bottom with part of each filler head projecting through one of said holes, each filler head having a hollow body provided with an upstanding cylinder and an inlet port fitted with a syrup inlet valve, a spring influenced liquid discharge valve located beneath said cylinder and having a valve seating adapted to be engaged by a can to be filled, spring influenced air and vacuum valves mounted upon said cylinder, means associated with said discharge valve for automatically opening and closing said air and vacuum valves during opening and closing movements of the discharge valve, means for automatically opening and closing said syrup inlet valve as a result of relative rotary movement between its filler head and said supporting frame, said syrup inlet valve being operatively connected with said discharge valve in such a manner that when the syrup inlet valve is open the main discharge valve is closed and vice versa for the purpose specified, said cylinder being surrounded by an outer casing forming an annular separating chamber around said cylinder which is provided with an inlet port near the bottom of the separating chamber which port is inclined transversely so as to impart a swirling motion to air and syrup entering said chamber when the latter is subjected to the influence of a vacuum, an outlet port being formed through the cylinder wall near the upper end of the separating chamber so as to permit air passing through the chamber to re-enter the cylinder and escape through said vacuum valve, said outlet port being inclined downwardly and transversely so as to impart a swirling motion to the air re-entering the cylinder which is provided at an intermediate point in its length with a transfer port adapted to be opened and closed during reciprocatory movements in the main discharge valve for the purpose specified.

3. Apparatus according to claim 1 wherein said transfer port includes a depending neck surrounding a stem of said discharge valve and being composed of rubber, plastic or other resilient material, said stem being provided with a tapered plug adapted to form a removable fluid tight fit in said depending neck when the discharge valve is opened for the purpose specified.

4. Apparatus according to claim 1 wherein an upstanding stem on said discharge valve is provided at its upper end with a piston or striking plate adapted to engage movable parts of said air and vacuum valves, said piston or striking plate being a loose fit in said cylinder so as to permit the free flow of air around the edge of the piston which also functions as a baffle to assist in separating liquid entrained in the outflowing air stream for the purpose specified.

5. Apparatus according to claim 2 wherein said means for actuating each syrup inlet valve includes separate lever mechanism for each filler head adapted to be actuated automatically during rotation of said main supply bowl in relation to said supporting frame, said lever mechanism including a lever intermediately pivoted upon the main supply bowl and operatively connected at its inner end with its syrup inlet valve, said connections being adjustable in length and including ball and socket fittings at the opposite ends thereof for the purpose specified, said lever being adapted at its outer end to traverse a circular trackway on said supporting frame during rotation of the supply bowl, said trackway having upper and lower tracks, the upper track being of sinuous form so as to cause the lever of each filler head to rise and fall and thus open and close its syrup inlet valve while cans continue to be fed to the apparatus for the purpose specified, said lower track forming part of no can, no feed mechanism for preventing closure of the syrup inlet valve and consequential opening of said discharge valve when feeding of the cans to the filler heads is interrupted, said no can, no feed mechanism including two circumferentially spaced transfer gaps in said trackway whereby the outer end of each said lever may be caused to traverse either the upper or lower track in accordance with requirements, said lower track being adapted to hold said syrup inlet valve open for the purpose specified, one of said gaps being fitted with a swinging gate adapted to be raised when the feeding of cans is interrupted so as to deflect the outer end of the next oncoming lever to the lower track, the other gap in said trackway being fitted with a fixed ramp for returning the lever on the lower track to the upper track after it has nearly completed a single traverse of the lower track for the purpose specified.

6. Apparatus according to claim 5 in combination with means for actuating said swinging gate, said last mentioned means consisting of a system of pivoted links and levers associated with a can conveyor provided for feeding cans to the apparatus, said system including a spring influenced swinging arm adapted to be engaged by each can as it is carried forward by the conveyor for the purpose specified.

7. Apparatus according to claim 5 in combination with electrical means for actuating said swinging gate, said last mentioned means including a solenoid associated with said swinging gate and wired in circuit with a switch adapted to be actuated by the cans to be filled as they are carried forward on said conveyor.

8. Apparatus of the kind indicated comprising in combination a stationary supporting frame carrying a main syrup supply bowl adapted for rotation in relation to said supporting frame, said supply bowl having a series of circumferentially spaced filler heads mounted therein so as to pass through holes in the bowl bottom each filler head having a hollow body carrying an upstanding cylinder and having a lateral branch with an inlet port fitted with a syrup inlet valve, a spring influenced liquid discharge valve located beneath said cylinder, an upstanding stem carrying said discharge valve and located axially within said cylinder and fitted at its upper end with a piston or striker plate forming a loose fit within said cylinder which is provided with a top closure having a series of ports and passages for a spring influenced air valve and a spring influenced vacuum valve adapted for connection to a vacuum pump, said air and vacuum valves being provided with movable parts adapted to be engaged simultaneously by said striker plate, an outer casing forming an annular separating chamber surrounding said cylinder which is provided with vertically spaced outlet and inlet ports which are inclined in relation to the cylinder wall so as to impart a swirling motion to fluid passing therethrough, a transfer port at an intermediate point in the height of said cylinder which is fitted with a depending resilient neck adapted to be closed and opened by a tapered plug carried by said stem, a rocker arm mounted within said hollow body so that one end engages said syrup inlet valve whilst the other end engages the stem of the main discharge valve which is spring influenced, means for opening and closing said syrup inlet valve including a pivoted lever for each filler head mounted upon the main supply bowl and operatively connected at its inner end to its syrup inlet valve whilst the outer end of each said lever arm is fitted with a roller adapted to track around a circular trackway on said supporting frame, said trackway having upper and lower tracks for the roller and a pair of spaced gaps one of which is fitted with a swinging gate and the other with a fixed ramp, said gate forming part of no can, no feed mechanism adapted to be actuated by cans to be filled as they are fed to the apparatus for the purpose specified.

9. For use in apparatus of the kind indicated, a filler head comprising a hollow body having an upstanding cylinder fitted with a top closure having ports and passages therein and associated spring influenced air and vacuum valves, an outer casing forming an annular separating chamber around said cylinder which is provided with upper and lower inlet and outlet ports which are inclined so as to impart a swirling motion to fluid passing therethrough, a discharge valve seating detachably connected to the bottom of said hollow body and having a discharge valve associated therewith, a reciprocatory stem having a tapered plug and carrying said discharge valve seating, said stem being mounted axially within said cylinder and provided at its upper end with a piston or striker plate forming a loose fit within the cylinder and adapted to engage simultaneously movable parts of said air and vacuum valves, a transfer port at an intermediate point in the height of said cylinder and having a depending resilient neck surrounding said stem and adapted to be opened and closed by the tapered plug on said stem which is spring influenced, said hollow body having an inlet port fitted with a syrup inlet valve and a rocker arm mounted in said hollow body between said syrup inlet valve and said stem so that one end of the rocker arm engages the latter whilst its other end engages the syrup inlet valve for the purpose specified.

References Cited in the file of this patent
UNITED STATES PATENTS

| | | |
|---|---|---|
| 1,670,862 | Malmquist | May 22, 1928 |
| 1,968,523 | Kantor | July 31, 1934 |
| 2,141,618 | Roge | Dec. 27, 1938 |
| 2,156,951 | Mondloch | May 22, 1939 |
| 2,428,598 | Weaver | Oct. 7, 1947 |
| 2,563,863 | Nordquist | Aug. 14, 1951 |
| 2,753,098 | Ward | July 3, 1953 |